2,700,564

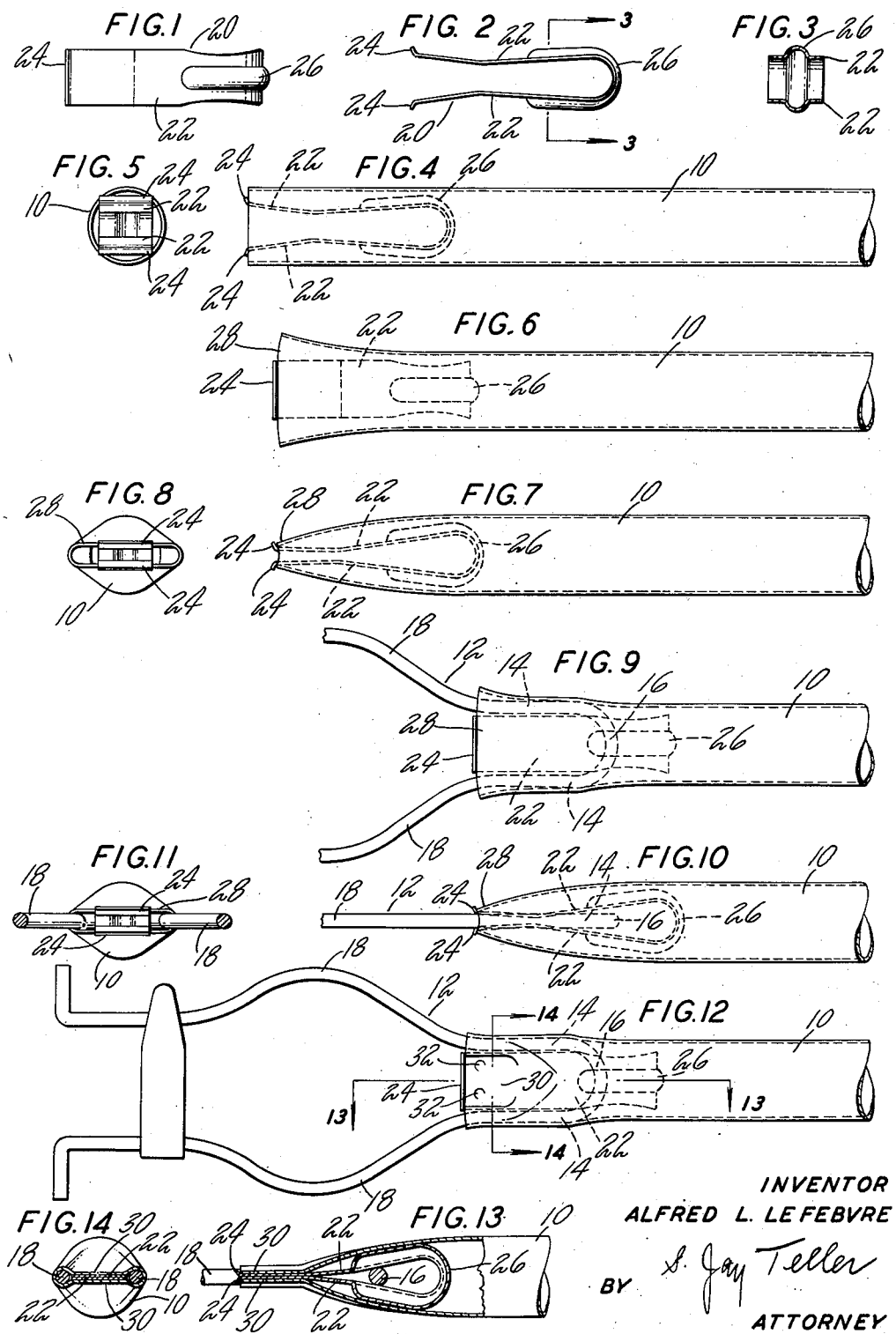
Jan. 25, 1955    A. L. LE FEBVRE    2,700,564
TUBE AND FORK CONNECTION AND METHOD OF MAKING
Filed Jan. 26, 1951
INVENTOR
ALFRED L. LE FEBVRE
BY
ATTORNEY

United States Patent Office 2,700,564
Patented Jan. 25, 1955

TUBE AND FORK CONNECTION AND METHOD OF MAKING

Alfred L. Le Febvre, Windsor, Conn., assignor to The Fuller Brush Company, Hartford, Conn., a corporation of Connecticut Application January 26, 1951, Serial No. 207,983

5 Claims. (Cl. 287—119)

The invention relates to a tube and fork connection and to a method of making the same. While not necessarily so limited, the invention is particularly useful for connecting a tubular metallic handle with a fork for holding a mop. The Cave Patent No. 1,692,110 shows a mop holding fork of the type herein referred to.

The general object of the invention is to provide a connection of the type mentioned and a method of making the same wherein the fork is rigidly connected with the tube and wherein the tube is reinforced adjacent the fork to resist bending.

In the drawing I have shown in detail a preferred embodiment of the structural features of the invention and a preferred method of making the same, but it will be understood that various changes may be made from the construction and the method shown, and that the drawing is not to be construed as defining or limiting the scope of the invention, the claims forming a part of this specification being relied upon for that purpose.

Of the drawing:

Fig. 1 is a plan view of a reinforcement member forming a part of a connection embodying the mechanical features of the invention and made in accordance with the method of the invention.

Fig. 2 is a side view of the member shown in Fig. 1.

Fig. 3 is a transverse sectional view taken along the line 3—3 of Fig. 2.

Fig. 4 is a side view of the reinforcement member preliminarily assembled with a tube constituting a handle.

Fig. 5 is a left end view of the preliminarily assembled parts shown in Fig. 4.

Fig. 6 is a plan view of the parts shown in Figs. 4 and 5 as they appear after the first deforming and bending operation.

Fig. 7 is a side view of the parts as shown in Fig. 6.

Fig. 8 is a left end view of the parts as shown in Figs. 6 and 7.

Fig. 9 is a plan view similar to Fig. 6 but also showing a fork assembled with the other parts.

Fig. 10 is a side view of the parts shown in Fig. 9.

Fig. 11 is a left end view of the parts shown in Figs. 9 and 10.

Fig. 12 is a view similar to Fig. 9 but showing the completed connection as it appears after the second or final deforming and bending operation.

Fig. 13 is a longitudinal sectional view taken along the line 13—13 of Fig. 12.

Fig. 14 is a transverse sectional view taken along the line 14—14 of Fig. 12.

Figs. 12, 13 and 14 of the drawing show a completed connection embodying the mechanical features of the invention. The said connection, for convenience and without any intended limitation, will be described as located in the position shown. It will be understood that such terms as "horizontal," "vertical," "upper," "lower" and the like are to be understood as merely defining the relationship of the parts.

The connection includes a metallic tube 10 constituting a handle and a connected forked member or fork 12. The forked member 12 has two horizontally spaced parallel portions 14, 14 with a transverse connecting loop portion 16 at the rear of the said parallel portions, the said forked member being a single wire bent to provide the said portions. The wire portions 14, 14 are extended forwardly as shown at 18, 18, these forwardly extending portions preferably diverging and being adapted to engage a suitable device such as a mop head. As concerns the forked member 12, a somewhat similar construction is shown in the aforesaid Cave patent.

The connection also includes a reinforcement member 20 which is initially shaped as shown in detail in Figs. 1 to 3. The reinforcement member is formed of a strip of sheet metal and the metal is bent so as to be generally U-shaped as shown. The reinforcement member has vertically spaced upper and lower legs 22, 22 and has a connecting loop portion at the rear of the said legs. The legs 22, 22 are preferably bent at their front ends to provide oppositely and outwardly extending flanges 24, 24. The member 20 is preferably formed with outwardly projecting means at the top and bottom of the rear portions of the legs 22, 22 thereof, this means being shown as a longitudinal bead 26 which extends along the rear portions of the said legs and around the connecting loop portion. Preferably, the forward portions of the legs 22, 22 substantially converge in the rearward direction as shown.

The member 20 is of such size that it can be inserted into the front portion of the handle or tube 10 as shown in Figs. 4 and 5, while the tube has its initial cylindrical shape. The front ends of the legs 22, 22 are substantially in register with the front end of the tube 10. The edges of the legs 22, 22 at the front ends thereof engage the inner wall of the tube and the corner portions of the flanges 24, 24 engage the front end face of the tube to limit movement of the member 20 inwardly or rearwardly into the tube.

With the handle or tube 10 and the reinforcement member 20 in the relative positions shown in Figs. 4 and 5, the front portion of the tube may be initially pressed and deformed so as to be partly flattened to the shape shown at 28 in Figs. 6, 7 and 8. The flanges 24, 24 prevent any additional movement of the reinforcement member into the tube and the said member is bent from the shape shown in Fig. 4 to the shape shown in Fig. 7. The front portions of the legs 22, 22 become approximately parallel, but they may converge to a very small extent. The inner faces of the rear portions of the said legs substantially diverge in the rearward direction. When the tube is initially partially flattened as described, the opening in the tube at the front thereof is vertically narrow and is horizontally wide and the reinforcement member is bent to such extents that the distance between the front ends of the legs 22, 22 is approximately equal to the diameter of the wire constituting the fork 12. By reason of the said initial partial flattening of the front end portion of the tube at 28 the width of the opening therein at the front end thereof is at least equal to the transverse horizontal dimension of the fork at the parallel portions 14, 14 thereof.

The rear portion of the fork 12 is inserted rearwardly into the front portion of the tube and between the legs of the reinforcement member to the relative position shown in Figs. 9, 10 and 11. The rearward insertion of the fork deforms the tube additionally to any initial deformation, as will be apparent from a comparison of Figs. 6 and 9.

With the several parts in the relative positions shown in Figs. 9, 10 and 11, the front portion of the handle or tube 10 is pressed and deformed to the shape shown in Figs. 12, 13 and 14, the reinforcement member 20 being correspondingly bent at the same time. The front portion of the tube is closely engaged with the parallel fork portions 14, 14 and the front portions of the legs 22, 22 of the reinforcement member are forced into engagement with each other between the said fork portions. The front portions of the top and bottom walls of the tube are forced between the parallel fork portions and into engagement with the said front portions of the said legs as shown at 30, 30. The final deformation of the front portion of the tube also causes the top and bottom walls thereof to engage the outwardly projecting means or bead 26 on the rear portions of the said legs of the reinforcement member as shown in Fig. 13, and the final bending of the said reinforcement member causes the diverging upper and lower inner faces of the rear portions of the said legs to engage the top and bottom of the loop portion 16 of the fork as also shown in Fig. 13.

The parts 30, 22, 22 and 30 are welded together at 32, 32, being thus permanently held in the relationship shown. The welding may be effected simultaneously with the final deformation and bending or subsequently as may be found preferable.

By reason of the described deforming of the front portion of the handle or tube 10 and the bending of the reinforcement member 20 and by reason of the welding at 32, 32, the fork is rigidly connected with the handle or tube. The engagement of the deformed front portion of the tube with the fork portions 14, 14 prevents any relative lateral movement of the fork. The frictional engagement with the fork portions 14, 14 is ordinarily sufficient to prevent any relative forward or rearward movement of the fork. However, the diverging portions 18, 18 engage the tube to positively prevent relative rearward movement of the fork, and the diverging inner faces of the rear portions of the legs 22, 22 engage the fork portion 16 to positively prevent any relative forward movement of the fork.

The reinforcement member 20 not only assists in holding the fork 12 but it also serves, particularly in cooperation with the portion 16 of the fork, to reinforce the front portion of the handle or tube. It is the said front portion of the handle which is subjected to the greatest stress, one source of severe stress being the frequent banging of the handle at the bottom of the front portion thereof against the top of the mop water pail. Without the reinforcement member such banging would bend the handle at the said front portion. Furthermore, the engagement of the loop portion 16 of the fork with the inner faces of the rear portions of the legs of the reinforcement member 20 as shown in Fig. 13 resists any tendency of the fork to move angularly relatively to the tube.

The invention claimed is:

1. A tube and fork connection comprising in combination, a fork having two horizontally spaced parallel portions and having a connecting loop portion at the rear of the said parallel portions, a reinforcement member having upper and lower legs and having a connecting loop portion at the rear of the said legs, the front portions of the legs of the said member being in engagement with each other between the parallel portions of the fork and in front of the loop portion thereof and the loop portion of the said member being at the rear of and spaced rearwardly from the loop portion of the fork, and a tube which at its front portion encloses the said parallel and loop portions of the fork and encloses the major portion of the reinforcement member with its top and bottom walls in engagement with the top and bottom of the rear portions of the legs of the said member near the loop portion thereof, the said tube closely engaging the said parallel fork portions and having the front portions of its top and bottom walls in engagement with the said front portions of the reinforcement member legs between the said parallel fork portions.

2. A tube and fork connection comprising in combination, a fork having two horizontally spaced parallel portions and having a connecting loop portion at the rear of the said parallel portions, a reinforcement member having upper and lower legs and having a connecting loop portion at the rear of the said legs which member has the front portions of its legs in engagement with each other between the parallel portions of the fork and in front of the loop portion thereof and which member has its loop portion at the rear of the loop portion of the fork, the rear portions of the legs of the said reinforcement member and also the loop portion of the said member having an outwardly projecting longitudinal bead, the inner portions of the legs of the said reinforcement member being in engagement with the said loop portion of the fork at the top and bottom thereof, and a tube which at its front portion encloses the said parallel and loop portions of the fork and encloses the major portion of the reinforcement member with its top and bottom walls in engagement with the bead at the top and bottom of the rear portions of the legs of the said member, the said tube closely engaging the said parallel fork portions and having the front portions of its top and bottom walls in engagement with the said front portions of the reinforcement member legs between the said parallel fork portions.

3. A tube and fork connection comprising in combination, a fork having two horizontally spaced parallel portions and having a connecting loop portion at the rear of the said parallel portions, the said fork also having forwardly diverging portions at the front of the said parallel portions, a reinforcement member having upper and lower legs and having a connecting loop portion at the rear of the said legs which member has the front portions of its legs engaging each other between the parallel portions of the fork and in front of the loop portion thereof and which member has its loop portion at the rear of and spaced rearwardly from the loop portion of the fork, the said reinforcement member having the rear portions of its said legs diverging rearwardly and engaging the loop portion of the fork at the top and bottom thereof to prevent relative forward movement of the fork, and a tube which at its front portion encloses the said parallel and loop portions of the fork and encloses the major portion of the reinforcement member with its top and bottom walls in engagement with the projecting means on the top and bottom of the rear portions of the legs of the said member near the loop portion thereof, the said tube closely engaging the said parallel fork portions and having the front portions of its top and bottom walls in engagement with the said front portions of the reinforcement member legs between the said parallel fork portions and the tube engaging the diverging portions of the fork to prevent relative rearward movement of the said fork.

4. The herein described method of making a tube and fork connection which method comprises in combination, providing an initially cylindrical longitudinal tube, providing a fork having two parallel longitudinal portions spaced apart horizontally by a distance greater than the interior diameter of the tube and having a connecting loop portion at the rear of the said parallel portions, providing a reinforcement member having two similar vertically spaced upper and lower longitudinal legs and having a connecting loop portion at the rear of the legs, longitudinally inserting the reinforcement member into the front portion of the cylindrical tube with the front ends of the said legs substantially in register with the front end of the tube, inserting the rear portion of the fork rearwardly into the front portion of the tube and between the legs of the reinforcement member, the engagement of the fork with the tube serving to deform the latter, and additionally deforming the front portion of the tube and simultaneously additionally bending the reinforcement member to cause the tube to closely engage the parallel portions of the fork and to cause the front portions of the legs of the said member to engage each other between the said parallel fork portions, the said additional deforming of the tube causing the front portions of the top and bottom walls thereof to engage the said front portions of the said legs between the said parallel fork portions and also causing other portions of the top and bottom walls of the tube to engage the top and bottom of the rear portions of the said legs.

5. The herein described method of making a tube and fork connection which method comprises in combination, providing an initially cylindrical longitudinal tube, providing a fork having two parallel longitudinal portions spaced apart horizontally by a distance greater than the interior diameter of the tube and having a connecting loop portion at the rear of the said parallel portions, providing a reinforcement member having two similar vertically spaced upper and lower longitudinal legs and having a connecting loop portion at the rear of the legs, longitudinally inserting the reinforcement member into the front portion of the cylindrical tube with the front ends of the said legs substantially in register with the front end of the tube, deforming the front portion of the tube to partially flatten it and simultaneously bending the reinforcement member which deforming of the tube shapes the opening at the front thereof so that it is adapted to receive the rear portion of the fork, longitudinally inserting the rear portion of the fork into the deformed front portion of the tube and between the legs of the reinforcement member, and additionally deforming the front portion of the tube and simultaneously additionally bending the reinforcement member to cause the tube to closely engage the parallel portions of the fork and to cause the front portions of the legs of the said member to engage each other between the said parallel fork portions, the said additional deforming of the tube causing the front portions of the top and bottom walls thereof to engage the said front portions of the said legs between the said parallel fork portions and also causing other portions of the top and bottom walls of the tube to engage the top and bottom of the rear portions of the said legs.

References Cited in the file of this patent

UNITED STATES PATENTS

| | | |
|---|---|---|
| 1,035,655 | Swenson | Aug. 13, 1912 |
| 1,131,863 | Phillips | Mar. 1, 1915 |
| 1,288,706 | Shanahan | Dec. 24, 1918 |
| 1,643,110 | Briggs | Sept. 20, 1927 |
| 1,692,110 | Cave | Nov. 20, 1928 |
| 1,765,651 | Bryant | June 24, 1930 |
| 1,793,293 | Varney | Feb. 17, 1931 |
| 1,849,234 | Johnson | Mar. 15, 1932 |
| 1,855,340 | Damon | Apr. 26, 1932 |
| 1,942,824 | McLeod | Jan. 9, 1934 |

FOREIGN PATENTS

| | | |
|---|---|---|
| 796,939 | France | Feb. 3, 1936 |
| 818,895 | France | June 28, 1937 |